United States Patent
Estes

(10) Patent No.: US 9,620,993 B2
(45) Date of Patent: Apr. 11, 2017

(54) AUTO-SYNCHRONOUS ISOLATED INLET POWER CONVERTER

(71) Applicant: Christopher A. Estes, Mountain View, CA (US)

(72) Inventor: Christopher A. Estes, Mountain View, CA (US)

(73) Assignee: Solpad, Inc., Mountain View, CA (US)

( * ) Notice: Subject to any disclaimer, the term of this patent is extended or adjusted under 35 U.S.C. 154(b) by 295 days.

(21) Appl. No.: 14/264,891

(22) Filed: Apr. 29, 2014

(65) Prior Publication Data

US 2014/0265591 A1    Sep. 18, 2014

Related U.S. Application Data

(63) Continuation-in-part of application No. 13/843,573, filed on Mar. 15, 2013, now Pat. No. 9,444,397, and
(Continued)

(51) Int. Cl.
*H02J 9/06* (2006.01)
*H02J 7/35* (2006.01)

(52) U.S. Cl.
CPC .......... *H02J 9/062* (2013.01); *Y10T 307/615* (2015.04); *Y10T 307/664* (2015.04)

(58) Field of Classification Search
CPC ....................................................... H02J 7/35
(Continued)

(56) References Cited

U.S. PATENT DOCUMENTS

| 5,977,659 A | 11/1999 | Takehara et al. |
| 8,242,634 B2 | 8/2012 | Schatz et al. |

(Continued)

FOREIGN PATENT DOCUMENTS

| DE | 40 32 569 A1 | 4/1992 |
| EP | 1 746 713 A1 | 1/2007 |

(Continued)

OTHER PUBLICATIONS

International Search Report and Written Opinion issued in International Patent Application No. PCT/US2014/028723, dated Sep. 23, 2014, 18 pages.
(Continued)

*Primary Examiner* — Robert Deberadinis
(74) *Attorney, Agent, or Firm* — Wood Herron & Evans LLP

(57) ABSTRACT

An auto-synchronous isolated inlet power converter is disclosed that can be daisy-chained with other power converters and/or an alternating current (AC) power source. The power converter automatically generates output AC power that is in parallel with external input AC power coming into the power converter when the power converter senses the external input AC power so that the power converter operates as a slave in this state. The power converter automatically generates output AC power when the power converter fails to detect the external input AC power coming into the power converter where the power converter operates as a master in this state. The power converter generates the output AC power without any reliance on the external input AC power generated by a utility grid and/or other AC power sources external to the power converter.

17 Claims, 6 Drawing Sheets

Related U.S. Application Data a continuation-in-part of application No. PCT/US2014/028723, filed on Mar. 14, 2014.

(60) Provisional application No. 61/719,140, filed on Oct. 26, 2012.

(58) Field of Classification Search
USPC .................................................. 307/87, 58
See application file for complete search history.

(56) References Cited

U.S. PATENT DOCUMENTS

| | | |
|---|---|---|
| 9,312,724 B2 | 4/2016 | Estes |
| 2002/0038667 A1 | 4/2002 | Kondo et al. |
| 2004/0031219 A1 | 2/2004 | Banister |
| 2008/0084117 A1 | 4/2008 | Sander et al. |
| 2008/0283118 A1 | 11/2008 | Rotzoll et al. |
| 2010/0043781 A1 | 2/2010 | Jones et al. |
| 2010/0088970 A1 | 4/2010 | Miller |
| 2011/0005567 A1 | 1/2011 | VanderSluis et al. |
| 2011/0060474 A1 | 3/2011 | Schmiegel et al. |
| 2011/0080044 A1 | 4/2011 | Schmiegel |
| 2011/0083733 A1 | 4/2011 | Marroquin et al. |
| 2011/0216562 A1* | 9/2011 | Gengenbach ............ H02J 3/18 363/71 |
| 2011/0278932 A1 | 11/2011 | Navarro et al. |
| 2011/0303262 A1 | 12/2011 | Wolter |
| 2012/0023841 A1 | 2/2012 | Renna |
| 2012/0031488 A1 | 2/2012 | Kaufman et al. |
| 2012/0037222 A1 | 2/2012 | Chan et al. |
| 2012/0085384 A1 | 4/2012 | Beitel et al. |
| 2012/0091810 A1 | 4/2012 | Aiello et al. |
| 2012/0104872 A1 | 5/2012 | Marroquin et al. |
| 2012/0173034 A1 | 7/2012 | Taima |
| 2012/0175964 A1 | 7/2012 | Yoscovich et al. |
| 2012/0182670 A1 | 7/2012 | Prax et al. |
| 2012/0228933 A1 | 9/2012 | Shiokawa |
| 2012/0235493 A1 | 9/2012 | Kiuchi et al. |
| 2012/0256490 A1 | 10/2012 | Zheng |
| 2012/0313443 A1 | 12/2012 | Cheng et al. |
| 2012/0315787 A1 | 12/2012 | Wiest et al. |
| 2013/0012061 A1 | 1/2013 | Rotzoll et al. |
| 2013/0014455 A1 | 1/2013 | Grieco |
| 2013/0057073 A1 | 3/2013 | Masciarelli et al. |
| 2013/0234645 A1 | 9/2013 | Goei et al. |
| 2013/0241485 A1 | 9/2013 | Snyder |
| 2013/0268436 A1 | 10/2013 | Snidow |
| 2014/0008987 A1 | 1/2014 | Tyagi et al. |
| 2014/0077597 A1 | 3/2014 | Nishibayashi et al. |
| 2014/0088780 A1 | 3/2014 | Chen |
| 2014/0116492 A1 | 5/2014 | Estes |
| 2014/0265591 A1 | 9/2014 | Estes |
| 2015/0001945 A1 | 1/2015 | Estes |
| 2015/0084416 A1 | 3/2015 | Nishibayashi et al. |
| 2015/0244306 A1 | 8/2015 | Estes |

FOREIGN PATENT DOCUMENTS

| | | |
|---|---|---|
| EP | 2874264 A1 | 5/2015 |
| JP | H11 89096 A | 3/1999 |
| WO | 2008/124144 A1 | 10/2008 |
| WO | 2014010442 A1 | 1/2014 |

OTHER PUBLICATIONS

International Preliminary Report on Patentability, issued by the International Bureau of WIPO in corresponding PCT Application No. PCT/US2014/028723 on Sep. 15, 2015 (12 pages).

International Search Report and Written Opinion issued in International Patent Application No. PCT/US2015/049933 mailed Feb. 15, 2016, 19 pages.

International Search Report and Written Opinion issued in International Patent Application No. PCT/US2016/031277, nailed Jul. 14, 2016, 14 pages.

International Search Report and Written Opinion issued in International Patent Application No. PCT/US2015/028222, dated Aug. 5, 2015, 11 pages.

* cited by examiner

AUTO-SYNCHRONOUS ISOLATED INLET POWER CONVERTER

CROSS-REFERENCE TO RELATED APPLICATIONS

The present application also claims the benefit of U.S. Nonprovisional application Ser. No. 13/843,573, filed Mar. 15, 2013, which claims the benefit of U.S. Provisional Appl. No. 61/719,140, filed Oct. 26, 2012, both of which are incorporated herein by reference in its entirety. The present application also claims the benefit of International Application No. PCT/US14/28723, filed Mar. 14, 2014, which claims the benefit of U.S. Nonprovisional application Ser. No. 13/843,573, of which is also incorporated herein by reference in its entirety.

BACKGROUND

Field of Disclosure

The present disclosure relates generally to power converters and specifically to power converters that operate as both a master and a slave.

Related Art

Conventional power inverters convert an input power to an output power so that the output power then powers external electronic devices as requested by an individual. Conventional power inverters are designed so that the input power is converted to the output power so that the output power is at a maximum power level based on the design specifications of the conventional power inverter. Conventional power inverters are limited to powering external electronic devices that require power that is equal to or less than the maximum power level of the conventional power inverters. Conventional power inverters cannot power external electronic devices that require power that exceeds the maximum power level of the conventional power inverters.

For example, a conventional power inverter converts input power which is DC power to output power that is AC power. The conventional power inverter is designed so that the DC power is converted to AC power at a particular maximum output power level, e.g., of 1500 Watts (W). The conventional power inverter can power a hair dryer that requires 1200 W but cannot power an electric saw that requires 2000 W. The user requesting to power the electric saw with the conventional power inverter designed for 1500 W cannot power the electric saw with that conventional power inverter.

Conventional power inverters cannot be daisy chained together to increase the output power of each conventional power inverter included in the daisy chain. For example, the conventional power inverter that is designed so that the output power is at a maximum level of 1500 W cannot be daisy chained with another conventional power inverter that is designed so that the output power is also at a maximum power level of 1500 W to increase the output power level of the daisy chain to power the electric saw that requires 2000 W. Rather another conventional power inverter that is designed so that the output power is at a maximum power level that is equal to or exceeds 2000 W would have to be located to power the electric saw.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number identifies the drawing in which the reference number first appears.

Figure 1:
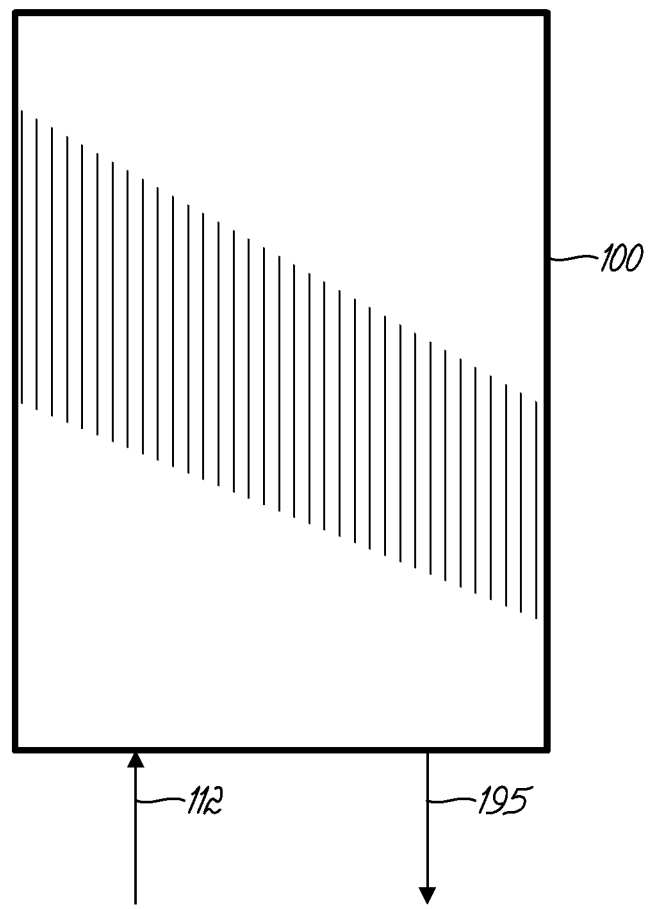
FIG. 1 illustrates a top-elevational view of an exemplary auto-synchronous isolated inlet power converter according to one exemplary embodiment of the present disclosure.

The present disclosure will now be described with reference to the accompanying drawings. In the drawings, like reference numbers generally indicate identical, functionally similar, and/or structurally similar elements. The drawing in which an element first appears is generally indicated by the leftmost digit(s) in the reference number.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," "an exemplary embodiment," an "example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions supplied by a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

An Exemplary Auto-Synchronous Isolated Inlet Power Converter

FIG. 1 illustrates a top-elevational view of an exemplary auto-synchronous isolated inlet power converter according to an exemplary embodiment of the present disclosure. An auto-synchronous isolated inlet power converter 100 may be a standalone AC power generating device so that the power converter 100 is not reliant on converting power provided by other power sources to the power converter 100. For example, the power converter 100 is not limited to generating output AC power 195 by passing through the external input AC power 112 received from a power source into the output AC power 195 when the power converter 100 is coupled to the power source. Rather, the power converter 100 may still generate standalone output AC power 195 when isolated from the power source and not receiving the external input AC power 112 from the power source. Further, the power converter 100 automatically synchronizes to the external input AC power 112 without user intervention. As a result, the power converter 100 may parallel the output AC power 195 generated from the inverted DC power provided by the DC source with the external input AC power 112 when the output AC power 195 is synchronized with the external input AC power 112. The DC source may be internal and/or external to the power converter 100 that will be apparent to those skilled in the relevant art(s) without departing from the spirit and scope of the disclosure.

The power converter 100 may receive the external input AC power 112. The external input AC power 112 may be AC power that is generated by a power source, such as a generator, AC inverter, and/or a utility grid. The power converter 100 may receive the external input AC power 112 generated by the power source when the power converter 100 is coupled to the power source. The external input AC power 112 may also be AC power generated by a second power converter when the power converter 100 is coupled to the second power converter. The external input AC power 112 may also be AC power generated by an AC power generator, AC power inverter, a sinusoidal AC power inverter, and/or any other type of AC power source independent from the power converter 100 that will be apparent to those skilled in the relevant art(s) without departing from the spirit and scope of the disclosure.

The power converter 100 may generate the output AC power 195 that is in parallel with the external input AC power 112 when the output AC power 195 is synchronized with the external input AC power 112. The power converter 100 may sense the external input AC power 112 when the power converter 100 is coupled to a power source. The power converter 100 may also sense the external input AC power 112 when the power converter 100 is coupled to the second power converter and the second power converter is providing the external input AC power 112 to the power converter 100.

The power converter 100 may determine whether the external input AC power 112 is synchronized with the output AC power 195 based on the power signal characteristics of the external input AC power 112 and the output AC power 195. The power signal characteristics are characteristics associated with the sinusoidal waveform included in the external input AC power 112 and the output AC power 195. The power converter 100 may generate the output AC power 195 that is in parallel with the external input AC power 112 when the power signal characteristics of the external input AC power 112 are within a threshold of the power signal characteristics of the output AC power 195 so that the external input AC power 112 and the output AC power 195 are synchronized. The power converter 100 may refrain from generating the output AC power 195 that is in parallel with the external input AC power 112 when the power signal characteristics of the external input AC power 112 are outside the threshold of the power signal characteristics of the output AC power 195 where the external input AC power 112 and the output AC power 195 are not synchronized.

For example, the power converter 100 determines whether the external input AC power 112 and the output AC power 195 are synchronized based on the frequency and the voltage of the sinusoidal waveform included in the external input AC power 112 and the frequency and the voltage of the sinusoidal waveform included in the output AC power 195. The power converter 100 generates the output AC power 195 that is in parallel with the external input AC power 112 when the frequency and the voltage of the external input AC power 112 are within the threshold of 10% from the frequency and the voltage of the output AC power 195 so that the external input AC power 112 and the output AC power 195 are synchronized. The power converter 100 refrains from generating the output AC power 195 that is in parallel with the external input AC power 112 when the frequency and the voltage of the external input AC power 112 are outside the threshold of 10% from the frequency and the voltage of the output AC power 195 where the external input AC power 112 and the output AC power 195 are not synchronized. Rather, the power converter 100 generates the output AC power 195 that is generated from the DC source and refrains from combining the output AC power 195 with the external input AC power 112.

The power signal characteristics may include but are not limited to frequency, phase, amplitude, current, voltage and/or any other characteristic of a power signal that will be apparent to those skilled in the relevant art(s) without departing from the spirit and scope of the disclosure. The power converter 100 may store the power signal characteristics of the external input AC power 112. The threshold of the power signal characteristics associated with the input power as compared to the output power may be any threshold that prevents damage from occurring to the power converter 100 by combining the external input AC power 112 and the output AC power 195 when the power signal characteristics of each significantly differ resulting in damage that will be apparent to those skilled in the relevant art(s) without departing from the spirit and scope of the disclosure.

The output AC power 195 generated by the power converter 100 may be AC power that may be used to power electronic devices external to the power converter 100, such as a hairdryer, for example. The output AC power 195 may also be AC power that may be provided to a third power converter. The power converter 100 may also convert the external input AC power 112 to DC power and store the DC power internally to the power converter 100 when the power converter is receiving the external input AC power 112 but not providing the output AC power 195 to the external electronic devices and/or the third power converter.

The power converter 100 may continue to provide output AC power 195 that is not in parallel with the external input AC power 112 after the power converter 100 is no longer receiving the external input AC power 112 thus the power converter 100 is not reliant on any other source to generate the output AC power 195. For example, the power converter 100 continues to provide output AC power 195 that is not in parallel with the external input AC power 112 after the power converter 100 is no longer coupled to a power source such that the power converter 100 is no longer receiving the external input AC power 112 from the power source. In another example, the power converter 100 continues to provide output AC power 195 that is not in parallel with the external input AC power 112 after the power converter 100 is no longer receiving the external input AC power 112 from the second power converter.

The power converter 100 may sense when the power converter 100 is no longer receiving the external input AC power 112. The power converter 100 may then internally generate the output AC power 195 from the previously stored DC power by the power converter 100. For example, the power converter 100 may have previously stored DC power that was converted from the input AC power 112 when the power converter 100 was receiving the input AC power 112. In another example, the power converter 100 may also have previously stored the DC power that was converted from solar energy captured by the power converter 100.

The power converter 100 may internally generate the output AC power 195 by converting the previously stored DC power into the output AC power 195. In one embodiment, the power converter 100 may synchronize the power signal characteristics of the output AC power 195 that was converted from the previously stored DC power to be within the threshold of the power signal characteristics of the input AC power 112 despite no longer receiving the input AC power 112. For example, the power converter 100 synchronizes the output AC power 195 that was converted from the previously stored DC power to have frequency and voltage that is within a threshold of 10% from the input AC power 112 when the power converter 100 was receiving the input AC power 112. The power converter 100 then provides the output AC power 195 when the power converter 100 is no longer receiving the input AC power 112 while providing such output AC power 195 with frequency and voltage that is within the threshold of 10% from the previously received input AC power 112.

The power converter 100 may be scalable in size and may be able to provide various levels of output power. For example, the power converter 100 may be a portable model that may output approximately 250 W. In another example, the power converter 100 may be a permanent rooftop model that may output 2.5 kW.

The power converter 100 may also be efficiently packaged so that each of the necessary components required to generate the output AC power 195 are packaged within a single housing for the power converter 100. For example, as will be discussed in more detail below, the DC source, DC to AC converter, controller, and/or each other necessary component required to generate the output AC power 195 may be housed within a single housing for the power converter 100. The housing of each necessary component within the single housing for the power converter 100 minimizes the amount of cabling required for the power converter 100 so that transmission loss from the cabling is minimized.

The power converter 100 may also be relatively user friendly in that an individual may find that operating the power converter 100 requires relatively minimal effort for the individual. For example, as will be discussed in more detail below, the individual simply plugs in an external electronic device into the outlet provided by the power converter 100 to power the external electronic device. In another example, the individual simply plugs in an additional power converter into the outlet provided by the power converter 100 to daisy chain the additional power converter to the power converter 100. In yet another example, the power converter 100 that is daisy chained to the additional power converter automatically establish a relationship so that the individual is not required to manually designate the master and the slave.

An Exemplary Auto-Synchronous Isolated Inlet Power Converter Configuration

Figure 2:
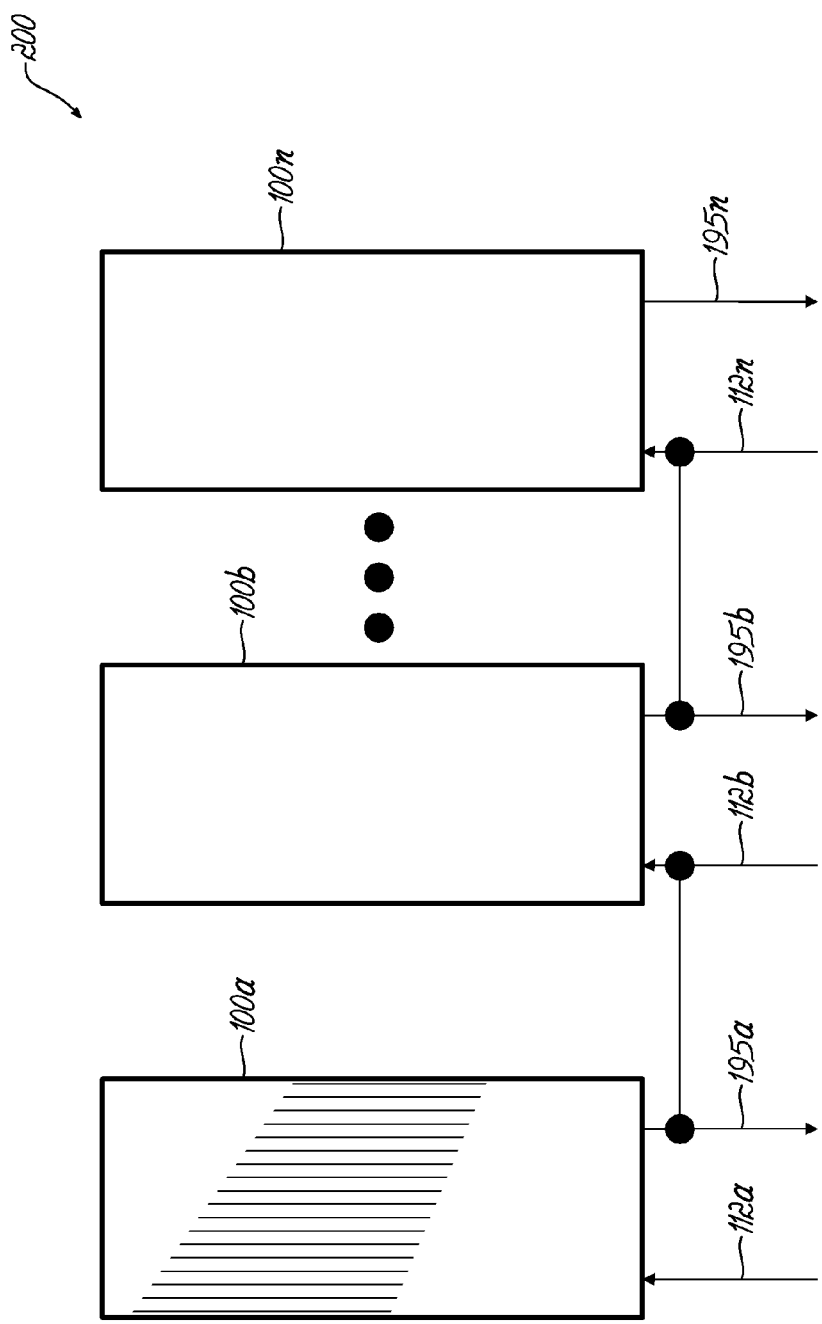
FIG. 2 illustrates a top-elevational view of an exemplary auto-synchronous isolated inlet power converter configuration according to one exemplary embodiment of the present disclosure.

FIG. 2 illustrates a block diagram of an auto-synchronous isolated inlet power converter configuration according to an exemplary embodiment of the present disclosure. The auto-synchronous isolated inlet power converter configuration 200 represents an auto-synchronous isolated inlet power converter configuration that includes a plurality of auto-synchronous isolated inlet power converters 100(a-n) that may be daisy chained together to form the auto-synchronous isolated inlet power converter configuration 200, where n is an integer greater than or equal to two. Each power converter 100(a-n) that is added to the power converter configuration 200 may generate the output AC power 195n that is in parallel with the output AC power 195a and the output AC power 195b of the power converter configuration 200. The power converter configuration 200 shares many similar features with the power converter 100; therefore, only the differences between the power converter configuration 200 and the power converter 100 are to be discussed in further detail.

As noted above, the power converter 100a generates the output AC power 195a. However, the power converter 100a may be limited to a maximum output power level for the output AC power 195a. For example, if the power converter 100a is limited to the maximum output power level of 500 Watts (W) for the output AC power 195a, then regardless of the input power level of the input AC power 112a, the maximum output AC power 195a for the power converter 100a is 500 W. However, if an individual desires to power a hair dryer that requires 1500 W to operate, the power converter 100a cannot power the hair dryer because its maximum output AC power 195a is 500 W.

However, additional power converters 100(b-n) may be daisy chained to the power converter 100a to parallel the output AC power 195a so that the overall output power of the power converter configuration 200 is increased. In daisy chaining the plurality of power converters 100(a-n), each power input for each power converter 100(b-n) is coupled to a power output 195(b-n) of an power converter 100(b-n) that is ahead of the power converter 100(b-n) in the daisy chain configuration. For example, the power input of the power converter 100b is coupled to the power output 195a of the power converter 100a so that the input AC power 112a received by the power converter 100b is substantially equivalent to the output AC power 195a of the power converter 100a. The power input 112n of the power converter 100n is coupled to the power output 195b of the power converter 100b so that the input AC power 112n received by the power converter 100n is substantially equivalent to the output AC power 195b of the power converter 100b.

After daisy chaining each of the plurality of power converters 100(a-n), each output AC power 195(a-n) may be paralleled with each input AC power 112a, 112b, and/or 112n to increase the overall output AC power of the power converter configuration 200. Each output AC power 195(a-n) may be paralleled with each input AC power 112a, 112b, and 112n so that the overall output AC power of the power converter configuration 200 may be used to power the external electronic device that the individual requests to operate, such as the hair dryer. The individual may access the overall output AC power by coupling the external electronic device that the individual requests to power, such as the hair dryer, into any of the power converters 100(a-n). The individual is not limited to coupling the external electronic device into the final power converter 100n in the power converter configuration 200 in order to access the overall output AC power. Rather, the individual may access the overall output AC power by coupling the external electronic device to any of the power converters 100(a-n) in the power converter configuration 200.

For example, if the maximum output AC power 195a for the power converter 100a is 500 W, the maximum output power that can be generated by the power converter 100b is also 500 W. The maximum output power that can be generated by the power converter 100n is also 500 W. However, the power converter 100b is daisy chained to the power converter 100a and the power converter 100b is daisy chained to the power converter 100n. As a result, the external input AC power 112a, 112b, and 112n for each of the power converters 100(a-n) is in parallel with the output AC power 195a, 195b, and 195n for each of the power converters 100(a-n).

The output AC power 195a, 195b, and 195n for each of the power converters 100(a-n) is 500 W. The power converter 100b generates the output AC power 195b of 500 W in parallel with the input AC power 112b of 500 W so that the output AC power 195b and/or the output AC power 195a is the paralleled AC output power of 1000 W when the power converter 100b is daisy chained to the power converter 100a. The power converter 100n is then daisy chained to the power converters 100a and 100b so that the output AC power 195a, the output AC power 195b and/or the output AC power 195n is the paralleled AC output power of 1500 W. Thus, the maximum output AC power for the power converter configuration 200 is 1500 W. The maximum output AC power of 1500 W is now sufficient to power the hair dryer that requires 1500 W to operate.

The individual may plug the hair dryer into any of the power converters 100(a-n) in order to access the maximum output AC power of 1500 W generated by the power converter configuration 200 to power the hair dryer. The individual is not limited to plugging the hair dryer into the power converter 100n simply because the power converter 100n is the last power converter in the daisy chain of the power converter configuration 200. The daisy chaining of each of the plurality of power converters 100(a-n) when the plurality of power converters 100(a-n) are not coupled to a power source but generating paralleled output AC power may be considered a standalone power converter micro grid.

Each of the power converters 100(a-n) included in the power converter configuration 200 may operate in a master/slave relationship with each other. The master may be the originator of the output AC power for the power converter configuration 200. The master may determine the power signal characteristics of the output AC power originated by the master in that each of the remaining slaves included in the power converter configuration 200 may be required to synchronize each of their own respective AC power output to the output AC power originated by the master. Each respective AC power output that is synchronized to the output AC power originated by the master may be paralleled with the output AC power for the master.

For example, if a gas powered electric generator is connected to the input AC power 112a, the gas generator becomes the master of the power converter configuration 200 when the gas generator is the originator of the input AC power 112a provided to the power converter 100a. The gas generator would determine the frequency and the voltage for the input AC power 112a. Each power converter 100(a-n) then become a slave and synchronizes each of their respective output AC power 195(a-n) to have frequency and voltage within a threshold of 10% of the frequency and voltage of the input AC power 112a. Each output AC power 195(a-n) that includes frequency and voltage within the threshold of 10% of the frequency and voltage of the AC power 112a is synchronized with the input AC power 112a and is then paralleled with the input AC power 112a.

Each of the power converters (100a-n) may operate as a slave for the power converter configuration 200 when each of the power converters 100(a-n) is receiving input AC power. Each of the power converters 100(a-n) may operate as a master when each of the power converters 100(a-n) no longer receives input AC power. For example, each of the power converters 100(a-n) operate as the slave when the power converter configuration 200 is coupled to the gas generator so that the gas generator operates as the master for the power converter configuration 200. Each of the power converters 100(a-n) is receiving input AC power. The power converter 100a is receiving the input AC power 112a from the gas generator making the power converter 100a the slave. The power converter 100b receives the input AC power 112*b* from the power converter 100*a* making the power converter 100*b* the slave. Finally, the power converter 100*n* receives the input AC power 112*n* from the power converter 100*b* making the power converter 100*n* the slave.

In another example, the power converter 100*a* operates as the master for the power converter configuration 200 when the power converter configuration 200 is no longer coupled to the power source and the power converter 100*a* is generating the output AC power 195*a*. Each of the power converters 100(*b-n*) is receiving input AC power via the output AC power 195*a* internally generated by the master power converter 100*a*. The power converter 100*b* receives the input AC power 112*b* from the power converter 100*a* and the power converter 100*n* receives the input AC power 112*n* from the power converter 100*b*.

The power converter configuration 200 may automatically transition the master/slave designations between each of the power converters 100(*a-n*) without user intervention. As noted above, each of the power converters 100(*a-n*) may be designated as the master of the power converter configuration 200 when any of the power converters 100(*a-n*) no longer receive input AC power. However, the master power converter 100(*a-n*) may automatically transition to the slave when the master power converter 100(*a-n*) senses input AC power coming into the master power converter 100(*a-n*). At that point, the power converter 100(*a-b*) may automatically terminate the internal generation of its own output AC power from its own previously stored DC power. The power converter 100(*a-n*) may automatically synchronize to the power signal characteristics of the input AC power now being received by the power converter 100(*a-n*) to parallel the output AC power generated by each power converter 100(*a-b*) with input AC power. The power converter 100(*a-n*) is no longer a master and transitions to a slave and begins generating output AC power from the input AC power now being received by it.

For example, when the power converter 100*b* operates as a master it is not receiving input AC power but is internally generating its own output AC power 195*b* from its own previously stored DC power. The power converter 100*b* will continue to operate as the master until the power converter 100*b* senses input AC power 112*b* now being received by the power converter 100*b*. The power converter 100*a* is now coupled to the power converter 100*b* and is generating the input AC power 112*b* now being received by the power converter 100*b*. The power converter 100*b* then automatically terminates internally generating its own output AC power 195*b* from its own previously stored DC power. The power converter 100*b* automatically synchronizes the output AC power 195*b* to be within the threshold of the frequency and voltage of the input AC power 112*b*, which again is the output AC power 195*a*, now being received from the power converter 100*a* to parallel the output AC power 195*b* to the input AC power 112*b*. The power converter 100*b* then transitions to the slave when the power converter 100*b* generates the output AC power 195*b* from the input AC power 112*b* rather than its own previously stored DC power.

The power converter configuration 200 may also automatically transition the slave power converter 100(*a-n*) to a master without user intervention. As noted above, the power converter 100(*a-n*) may be designated as the slave of the power converter configuration 200 when the power converter 100(*a-n*) is receiving input AC power. However, the slave power converter 100(*a-n*) may automatically transition to the master when the slave power converter 100(*a-n*) no longer senses input AC power coming into the slave power converter 100(*a-n*). At that point, the power converter 100(*a-n*) may automatically begin internally generating its own output AC power from its own previously stored DC power. The power converter 100(*a-n*) may have stored the power signal characteristics of the input power previously received by the power converter 100(*a-n*). The power converter 100(*a-n*) may automatically synchronize its own output AC power to the input AC power no longer received by the power converter 100(*a-n*) based on the stored power signal characteristics to parallel the output AC power to the input AC power. The power converter 100(*a-b*) is no longer a slave and transitions to a master when the power converter 100(*a-b*) begins internally generating its own output AC power from its own previously stored DC power.

After the master-slave relationship is established between each of the master power converters 100(*a-n*), the paralleled output AC power of the master power converter configuration 200 may be maintained by the master power converter 100*a* and each of the slave power converters 100(*b-n*). The master power converter 100*a* may maintain the voltage of the paralleled output AC power while the slave power converters 100(*b-n*) provide the current to maintain the voltage of the paralleled output AC power at a reference voltage.

However, the voltage of the paralleled output AC power may decrease when the external electronic device the individual requests to power, such as the hair dryer, is coupled to at least one of the outputs for the power converters 100(*a-n*). Each of the slave power converters 100(*b-n*) may increase the current of the paralleled output AC power so that the voltage of the paralleled output AC power maintained by the master power converter 100*a* is increased back to the reference voltage sufficient to generate the paralleled output AC power. The reference voltage of the paralleled output AC power is the voltage level that is to be maintained to generate the paralleled output AC power that is sufficient to power the external electronic device. The reference voltage may be specified to be any voltage that is sufficient to maintain the paralleled output AC power that will be apparent to those skilled in the relevant art(s) without departing from the spirit and scope of the disclosure.

Each of the slave power converters 100(*b-n*) may continue to generate current sufficient to maintain the voltage of the paralleled output AC power at the reference voltage so that the external electronic device is powered by the paralleled output AC power. However, eventually each of the slave power converters 100(*b-n*) may have their DC sources depleted to the point where each of the slave power converters 100(*b-n*) no longer have current that is sufficient to maintain the voltage of the paralleled output AC power at the reference voltage sufficient to generate the paralleled output AC power. At that point, the master power converter 100*a* may begin to provide current to maintain the voltage of the paralleled output AC power at the reference voltage sufficient to generate the paralleled output AC power.

The power converter configuration 200 may continue to generate output AC power despite when the slave power converter 100(*a-n*) is no longer functional. The dysfunctional slave power converter 100(*a-n*) may continue to pass through the output AC power generated by the master power converter 100(*a-n*) to each of the other slave power converters 100(*a-n*). For example, the master power converter 100*a* acts as the master and the power converters 100(*b-n*) act as the slaves. If the slave power converter 100*b* fails and is no longer functional, the dysfunctional slave power converter 100*b* continues to pass through the output AC power 195*a* generated by the master power converter 100*a* to the functional slave power converter 100*n* so that the functional slave power converter power converter 100n continues to generate the output AC power 195n from the output AC power 195a.

An Exemplary Auto-Synchronous Isolated Inlet Power Converter

Figure 3:
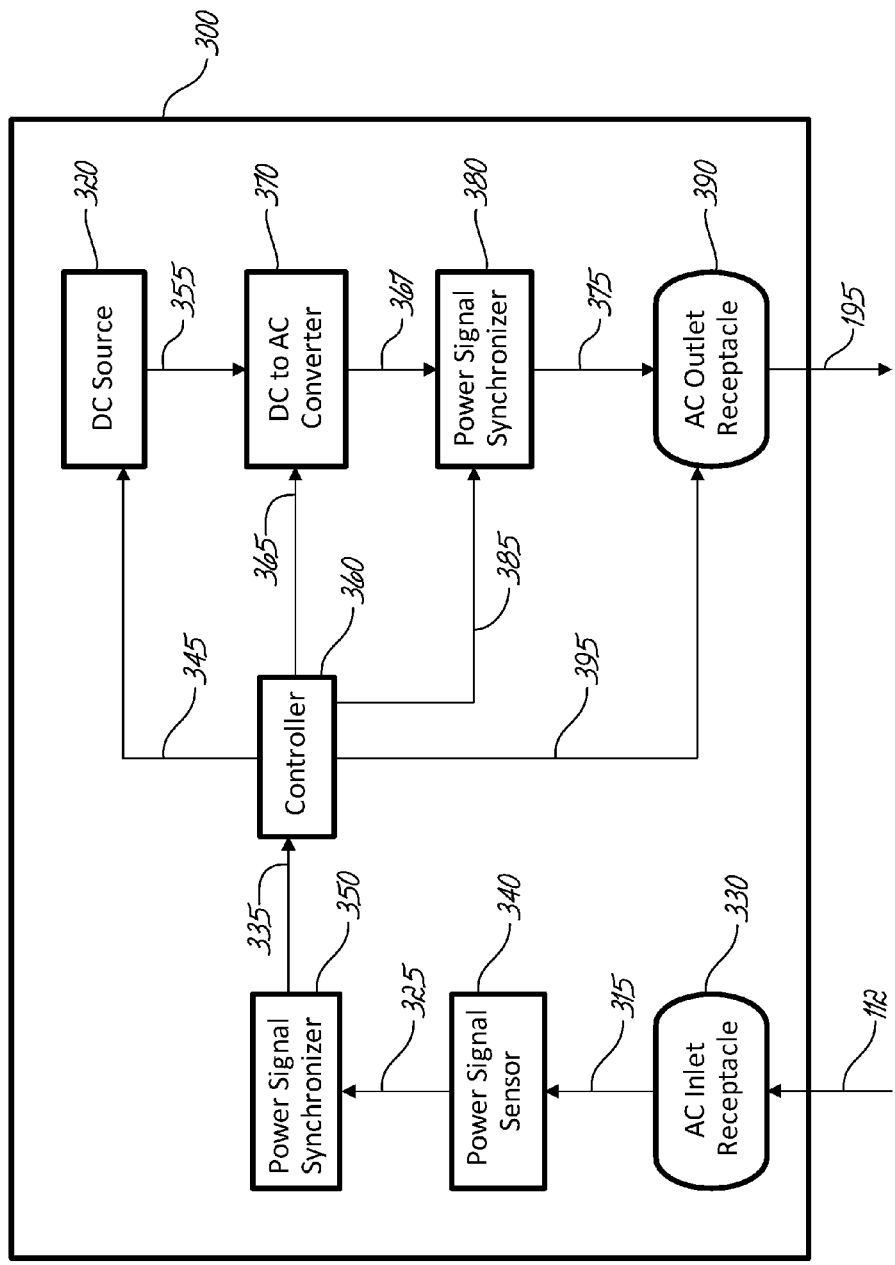
FIG. 3 is a block diagram of the exemplary auto-synchronous isolated inlet power converter that may be used in the auto-synchronous isolated inlet power converter configuration according to one exemplary embodiment of the present disclosure.

FIG. 3 is a block diagram of an exemplary auto-synchronous isolated inlet power converter 300 that may be used in the auto-synchronous isolated inlet power converter configuration 200 according to an exemplary embodiment of the present disclosure. Although, FIG. 3 depicts a block diagram of the power converter 300, one of ordinary skill in the art will recognize that FIG. 3 may also depict a block diagram of the functionality of the plurality of power converters 100(a-n) used in the power converter configuration 200 depicted in FIG. 2 and also the functionality of the power converter 100 depicted in FIG. 1. The power converter 300 may automatically transition to internally generating output AC power 195 based on the DC power 355 provided by the DC source 320 when the power signal sensor 340 no longer senses the received input AC power 315. The power converter 300 may also automatically transition to operating as a master when the power signal sensor 340 no longer senses the received input AC power 315. The power converter 300 may also automatically transition to operating as a slave when the power signal sensor 340 begins to sense the received input AC power 315.

The power converter 300 may be implemented using a DC source 320, an AC inlet receptacle 330, a power signal sensor 340, a power signal synchronizer 350, a controller 360, a DC to AC converter 370, a power signal synchronizer 380, and an AC outlet receptacle 390. Each of which is enclosed within a housing for the power converter 300. The power converter 300 shares many similar features with the power converter 100 and the plurality of power converters 100(a-n); therefore, only the differences between the power converter 300 and the power converter 100 and the plurality of power converters 100(a-n) are to be discussed in further detail.

The DC source 320 receives and stores DC power 355. The DC source 320 stores the DC power 355 until requested to provide the DC power 355. The DC power 355 provided by the DC source 320 may include low-voltage but high energy DC power. The DC source 320 may include one or more lithium ion phosphate (LiFePO$_4$) and/or one or more lead acid cells. However, this example is not limiting, those skilled in the relevant art(s) may implement the DC source 320 using any other DC source and/or other battery chemistries without departing from the scope and spirit of the present disclosure. The one or more cells of the DC source 320 convert chemical energy into electrical energy via an electromechanical reaction. The DC source 320 may be internal and/or external to the power converter 300 that will be apparent to those skilled in the relevant art(s) without departing from the spirit and scope of the disclosure.

As noted above, the power converter 300 may automatically transition between the master and/or slave designations without user intervention. The power converter 300 may be operating as a slave when the AC inlet receptacle 330 is receiving the external input AC power 112. The input AC power 112 may be AC power that is generated by the power source. The AC inlet receptacle 330 may receive the input AC power 112 when the AC inlet receptacle 330 is coupled to the power source. The input AC power 112 may also be AC power generated by a second power converter when the AC inlet receptacle 330 is coupled to the second power converter. The input AC power 112 may also be AC power generated by an AC power generator, AC power inverter, and/or any other type of AC power source independent from the power converter 300 that will be apparent to those skilled in the relevant art(s) without departing from the spirit and scope of the disclosure.

The AC inlet receptacle 330 may include a male configuration or a female configuration. In one embodiment, the AC inlet receptacle 330 may include a male configuration so that an individual cannot mistakenly plug an external electronic device into the AC inlet receptacle with the intent to power the external electronic device. Typically, external electronic devices include plugs in male configurations. The AC inlet receptacle 330 may be fuse protected. The AC inlet receptacle 330 may be configured to receive the input AC power 112 in American, European, and/or any other power format that will be apparent to those skilled in the relevant art(s) without departing from the spirit and scope of the disclosure. The AC inlet receptacle 330 may include an Edison plug, any of the several International Electrotechnical Commission (IEC) plugs and/or any other type of plug that will be apparent to those skilled in the relevant art(s) without departing from the spirit and scope of the disclosure.

The AC inlet receptacle 330 may provide received input AC power 315 to a power signal sensor 340. The power signal sensor 340 may sense the power converter 300 is receiving the input AC power 112 through the AC inlet receptacle 330 based on the received input AC power 315 received from the AC inlet receptacle 330. After the power signal sensor 340 senses the received input AC power 315, the power signal sensor 340 generates an incoming AC power signal 325. The incoming AC power signal 325 provides information regarding power signal characteristics of the input AC power 112 that the power converter 300 is receiving through the AC inlet receptacle 330. The incoming AC power signal 325 may provide information regarding power signal characteristics of the input AC power 112 that includes but is not limited to frequency, phase, amplitude, current, voltage and/or any other characteristic of a power signal that will be apparent to those skilled in the relevant art(s) without departing from the spirit and scope of the disclosure.

The power signal sensor 340 provides the incoming AC power signal 325 to a power signal synchronizer 350. The power signal synchronizer 350 determines the power signal characteristics of the input AC power 112 that are provided by the incoming AC power signal 325. For example, the power signal synchronizer 350 determines the frequency, phase, amplitude, voltage and/or current of the input AC power 112. The power signal synchronizer 350 generates a synchronized input power signal 335 that provides the power signal characteristics of the input AC power 112 to a controller 360. In one embodiment, the power signal synchronizer 350 determines the power signal characteristics of the input AC power 112 by monitoring the voltage of the incoming AC power signal 325.

The power signal synchronizer 350 also synchronizes the converted AC power 367 that is generated by the DC to AC converter 370 with the power signal characteristics of the input AC power 112. The power signal synchronizer 350 determines whether the power signal characteristics of the input AC power 112 are within the threshold of the power signal characteristics of the converted AC power 367. The power signal synchronizer 350 synchronizes the input AC power 112 with the converted AC power 367 when the power signal characteristics of the input AC power 112 are within the threshold of the power signal characteristics of the converted AC power 367. The power signal synchronizer 350 refrains from synchronizing the input AC power 112 with the converted AC power 367 when the power signal characteristics of input AC power 112 are outside the threshold of the power signal characteristics of the converted AC power 367.

For example, the power signal synchronizer 350 determines whether the frequency and the voltage of the sinusoidal waveform included in the input AC power 112 are within a threshold of 10% from the frequency and the voltage of the sinusoidal waveform included in the converted AC power 367. The power signal synchronizer 350 synchronizes the input AC power 112 with the converted AC power 367 when the frequency and the voltage of the input AC power 112 are within the threshold of 10% from the frequency and the voltage of the converted AC power 367. The power signal synchronizer 350 refrains from synchronizing the input AC power 112 with the converted AC power 367 when the frequency and the voltage of the input AC power 112 are outside the threshold of 10% from the frequency and the voltage of the converted AC power 367.

The output AC power 195 includes the input AC power 112 in parallel with the converted AC power 367 when the converted AC power 367 is synchronized with the input AC power 112. For example, the power signal synchronizer 350 synchronizes the converted AC power 367 to operate at within the threshold of 10% from the frequency and voltage of the input AC power 112. In one embodiment, the input AC power 112 embodies a substantially pure sinusoidal waveform. The substantially pure sinusoidal waveform may represent an analog audio waveform which is substantially smooth and curved rather than a digital audio waveform that includes squared off edges. In such an embodiment, the power signal synchronizer 350 synchronizes the converted AC power 367 to be within a threshold of the pure sinusoidal waveform embodied by the input AC power 112. After the power signal synchronizer 350 synchronizes the converted AC power 367 to the power signal characteristics of the input AC power 112, the power signal synchronizer 350 notifies the controller 360 of the synchronization via the synchronized input power signal 335.

The controller 360 receives the synchronized input power signal 335. The controller 360 determines the power signal characteristics of the input AC power 112 and then stores the power signal characteristics in a memory included in the controller 360. For example, the controller 360 stores the frequency, phase, amplitude, voltage and/or current of the input AC power 112. After receiving the synchronized input power signal 335, the controller 360 is aware that the input AC power 112 is coupled to the AC inlet receptacle 330. In response to the input AC power 112 coupled to the AC inlet receptacle 330, the controller 360 stops generating a reference clock for the power converter 300 because the converted AC power 367 is now synchronized with the input AC power 112.

Also, in response to the input AC power 112 coupled to the AC inlet receptacle 330, the controller 360 also generates a DC source signal 345. The controller 360 instructs the DC source 320 via the DC source signal 345 to no longer provide the DC power 355 to the DC to AC inverter 370. The instruction by the controller 360 to the DC source 320 to no longer provide the DC power 355 to the DC to AC inverter 370 also terminates the output AC power 195 that is generated from the DC power 355.

Further, in response to the input AC power 112 coupled to the AC inlet receptacle 330, the controller 360 confirms that the power signal synchronizer 350 has synchronized the converted AC power 367 to the power signal characteristics of the input AC power 112. After confirming that the power signal synchronizer 350 has synchronized the converted AC power 367 to the power signal characteristics of the input AC power 112, the controller 360 links in parallel the input AC power 112 being received by the AC inlet receptacle 330 with the converted AC power 367 to the AC outlet receptacle 390 to generate the parallel AC power 195. The AC outlet receptacle 390 then outputs the output AC power 195 that includes the input AC power 112 in parallel with the converted AC power 367 with power signal characteristics that are within the threshold of the power signal characteristics of the input AC power 112. For example, the frequency and voltage of the output AC power 195 may be within the threshold of the frequency and voltage of the input AC power 112.

The controller 360 refrains from linking in parallel the input AC power 112 being received by the AC inlet receptacle 330 with the converted AC power 367 to the AC outlet receptacle 390 to generate the parallel AC power 395 when the input AC power 112 fails to synchronize with the converted AC power 367. Rather, the converted AC power 367 is simply provided to the AC outlet receptacle 390 so that the output AC power 195 is output AC power that includes the converted AC power 367 but does not include the input AC power 112 in parallel with the converted AC power 367.

The AC outlet receptacle 390 may include a male configuration or a female configuration. In one embodiment, the AC outlet receptacle 390 may include a female configuration so that an individual can easily plug an external electronic device into the AC outlet receptacle 390 with the intent to power the external electronic device. Typically, external electronic devices include plugs in male configurations. In another embodiment, the AC outlet receptacle 390 may include a configuration that is opposite that of the AC inlet receptacle 330. For example, the AC inlet receptacle 330 may include a male configuration while the AC outlet receptacle 390 includes a female configuration.

The AC outlet receptacle 390 may be fuse protected. The AC outlet receptacle 390 may be configured to provide the output AC power 195 in American, European, and/or any other power format that will be apparent to those skilled in the relevant art(s) without departing from the spirit and scope of the disclosure. The AC outlet receptacle 390 may include an Edison plug, any of the several International Electrotechnical Commission (IEC) plugs and/or any other type of plug that will be apparent to those skilled in the relevant art(s) without departing from the spirit and scope of the disclosure.

As noted above, the power converter 300 may automatically transition between the master and/or slave designations without user intervention. The power converter 300 may automatically transition from operating as a slave to operating as a master when the AC input power signal 112 diminishes and is no longer received by the AC inlet receptacle 330. The controller 360 no longer receives the synchronized input power signal 335 providing information regarding the external input AC power 112. At that point, the controller 360 generates the DC source signal 345 to instruct the DC source 320 to begin generating the DC power 355. The controller 360 generates a power conversion signal 365 to instruct the DC to AC converter 370 to convert the DC power 355 to converted AC power 367. The converted AC power 367 is high-voltage output AC power. In one embodiment, the DC to AC converter 370 may use high frequency modulation in converting the DC power 355 to the converted AC power 367.

The controller 360 then provides a synchronized output power signal 385 to the power signal synchronizer 380. The synchronized output power signal 385 provides the power signal characteristics of the external input AC power 112 when the input power signal 112 was coupled to the AC inlet receptacle 330 to the power signal synchronizer 380. For example, the synchronized output power signal 385 provides the frequency, phase, amplitude, voltage and/or current of the input power signal 112 to the power signal synchronizer 380. The synchronized output power signal 385 also provides a reference clock to the power signal synchronizer 380.

The power signal synchronizer 380 then generates synchronized output AC power 375 by synchronizing the converted AC power 367 to the power signal characteristics of the input AC power 112 and the reference clock provided by the synchronized output power signal 385. In one embodiment, the input AC power 112 embodies a substantially pure sinusoidal waveform. In such an embodiment, the power signal synchronizer 380 synchronizes the converted AC power 367 to be within the threshold of the pure sinusoidal waveform embodied by the input AC power 112. The synchronized output AC power 375 includes power signal characteristics that are within the threshold of the power signal characteristics of the input AC power 112. For example, the synchronized output AC power 375 includes a frequency and voltage that is within the threshold of the frequency and voltage of the input AC power 112. The AC outlet receptacle 390 then generates the output AC power 195 based on the synchronized output power 375. Thus, the power converter 300 generates the output AC power 195 that is substantially similar to the input AC power 112 despite not receiving the input AC power 112 from other sources.

An Exemplary Auto-Synchronous Isolated Inlet Power Converter

Figure 4:
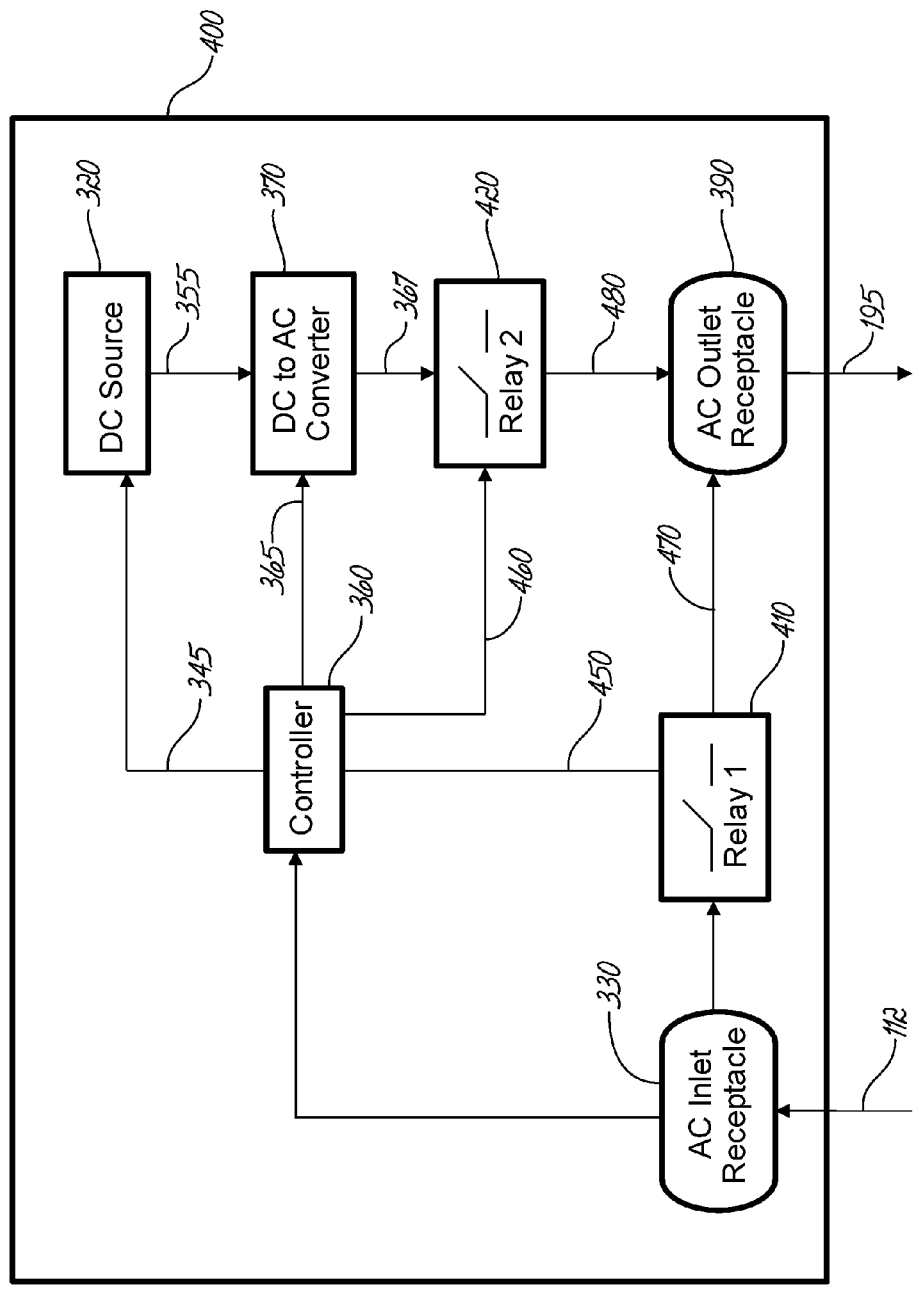
FIG. 4 is a block diagram of the exemplary auto-synchronous isolated inlet power converter that may be used in the auto-synchronous isolated inlet power converter configuration according to one exemplary embodiment of the present disclosure.

FIG. 4 is a block diagram of an exemplary auto-synchronous isolated inlet power converter 400 that may be used in the auto-synchronous isolated inlet power converter configuration 200 according to an exemplary embodiment of the present disclosure. Although, FIG. 4 depicts a block diagram of the power converter 400, one of ordinary skill in the art will recognize that FIG. 4 may also depict a block diagram of the plurality of power converters 100(a-n) used in the power converter configuration 200 depicted in FIG. 2 and also the power converter 100 depicted in FIG. 1. One of ordinary skill in the art will also recognize that features depicted in the block diagram of the power converter 300 may also be included in the power converter 400 but have been omitted for clarity.

The power converter 400 may automatically transition from operating as a master and operating as a slave without user intervention based on a relay configuration. The transitioning of the relay configuration may automatically transition the power converter 400 between operating as a master and operating as a slave without user intervention. The power converter 400 may be implemented using the DC source 320, the AC inlet receptacle 330, the controller 360, the DC to AC converter 370, the AC outlet receptacle 390, a first relay 410 and a second relay 420. Each of which is enclosed within a housing for the power converter 400. The power converter 400 shares many similar features with the power converter 100, the plurality of power converters 100(a-n), and the power converter 300; therefore, only the differences between the power converter 400 and the power converter 100, the plurality of power converters 100(a-n), and the power converter 300 are to be discussed in further detail.

As noted above, the power converter 400 operates as a slave when the controller 360 senses that the input AC power 112 is coupled to the AC inlet receptacle 330. The controller 360 then terminates the generation of the output AC power 195. The power converter 400 operates as a master when the controller 360 no longer senses that the input AC power 112 is coupled to the AC inlet receptacle 330. The controller 360 then instructs the DC source 320 and the DC to AC inverter 370 to begin generating the output AC power 195. The relay configuration that includes a first relay 410 and a second relay 420 transitions the power converter 400 between the master and slave modes based on the logic provided in Table 1. The relay configuration that includes the first relay 410 and the second relay 420 may include but is not limited to a metal-oxide-semiconductor field-effect transistor (MOSFET), a transistor, an insulated-gate bipolar transistor (IGBT), a solid-state switch, a solid state relay, spring loaded relay switches and/or any other relay and/or combination of relays that will be apparent to those skilled in the relevant art(s) without departing from the spirit and scope of the disclosure.

TABLE 1

| | | |
|---|---|---|
| Master Mode | Relay 1 Open | Relay 2 Closed |
| Slave Mode | Relay 1 Closed | Relay 2 Closed |
| Unit Power Off (Bypassed) | Relay 1 Closed | Relay 2 Open |

When automatically transitioning from the slave mode to the master mode, the controller 360 no longer senses the input AC power 112 coupled to the AC inlet receptacle 330. At this point, the controller 360 generates a first relay signal 450 that instructs the first relay 410 transition to the open state (logic 0). The controller 360 also generates a second relay signal 460 that instructs the second relay 420 to transition to the closed state (logic 1). The controller 360 also generates DC source signal 345 that instructs the DC source 320 to begin providing the DC power 355 to the DC to AC converter 370 to generate the converted AC power 367. Because the second relay 420 is in the closed position (logic 1), the converted AC power 367 passes through the second relay 420, and as shown by arrow 480, onto the AC outlet receptacle 390 so that the power converter 400 provides the output AC power 195 generated from the DC power 355 rather than the input AC power 112. The open state (logic 0) of the first relay 410 prevents any remaining input AC power 112 from passing through to the AC output receptacle 390 when the power converter 400 is generating the output AC power 195 as operating as the master. As a result, the AC inlet receptacle 330 may be isolated from the AC outlet receptacle 390.

Once the controller 360 senses the input AC power 112 coupled to the AC inlet receptacle 330, the controller 360 automatically generates the power conversion signal 365 to instruct the DC to AC converter 370 to no longer provide the converted AC power 367 so that the power converter 400 no longer generates the output AC power 195. The controller 360 also automatically generates the second relay signal 460 to instruct the second relay 420 to transition to the open state (logic 0). The controller 360 also generates the first relay signal 450 to instruct the first relay 410 to transition to the closed state (logic 1). After the second relay 420 transitions to the open state (logic 0) and the first relay 410 transitions to the closed state (logic 1), any input AC power 112 coupled to the AC inlet receptacle 330 passes through the first relay 410, and as shown by arrow 470, onto the AC outlet receptacle 390 so that the power converter 400 generates the output AC power 195.

However, the second relay 420 is still in the open state (logic 0). The controller 360 is not going to instruct the second relay 420 to transition into the closed state (logic 1) until the controller 360 has successfully synchronized the power converter 400 to the input AC power 112 coupled to the AC inlet receptacle 330. After the controller 360 properly synchronizes the power converter 400 to the input AC power 112, the controller 360 generates the second relay signal 460 to instruct the second relay 420 to transition from the open state (logic 0) to the closed state (logic 1). After the second relay 420 transitions from the open state (logic 0) to the closed state (logic 1), then the power converter 400 is generating output AC power 195 that includes the converted AC power 367 that is in parallel to the input AC power 112.

The power converter 400 also operates in a bypass mode. In the bypass mode, the power converter 400 is powered off and is no longer functioning. In embodiment, the controller 360 generates the first relay signal 450 and instructs the first relay 410 to transition into the closed state (logic 1). The controller 360 also generates the second relay signal 460 and instructs the second relay 420 to transition into the open state (logic 0). In another embodiment, the first relay 410 and the second relay 420 are spring loaded relay switches. When the power converter 400 powers off, the electromagnetic coil of the first relay 410 is no longer energized so the spring pulls the contacts in the first relay 410 into the up position. The closing of the first relay 410 and the opening of the second relay 420 cause the power converter 400 to be a pass through where the input AC power 112 passes through the power converter 400 and onto a second power converter daisy chained to the power converter 400 and/or to an external electronic device being powered by the external input AC power 112. Thus, additional power converters and/or external electronic devices down the line from the dysfunctional power converter 400 continue to operate off of the external input AC power 112. The first relay 410 and the second relay 420 may be implemented may be implemented in hardware, firmware, software, or any combination thereof that will be apparent to those skilled in the relevant art(s) without departing from the spirit and scope of the disclosure.

Figure 5:
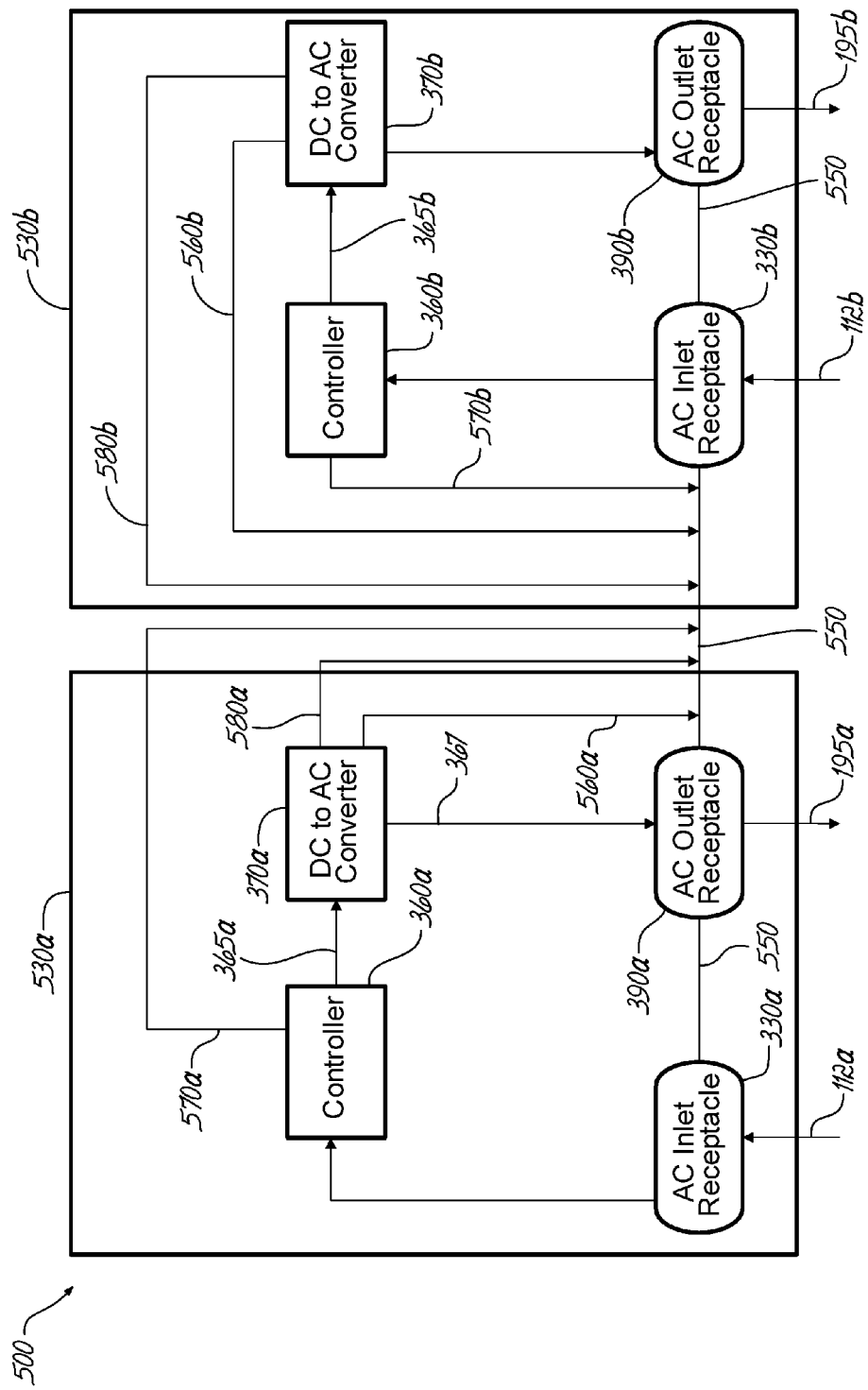
FIG. 5 is a block diagram of the exemplary auto-synchronous isolated inlet power converter configuration according to one exemplary embodiment of the present disclosure.

A Second Examplary Auto-Synchronous Isolated Inlet Power Converter Configuration FIG. 5 is a block diagram of an exemplary auto-synchronous isolated inlet power converter configuration 500 according to an exemplary embodiment of the present disclosure. Although, FIG. 5 depicts a block diagram of the auto-synchronous isolated inlet power converter configuration 500, one of ordinary skill in the art will recognize that FIG. 5 may also depict a block diagram of the plurality of auto-synchronous isolated inlet power converters 100(a-n) used in the auto-synchronous isolated inlet power converter configuration 200 depicted in FIG. 2 and also the auto-synchronous isolated inlet power converter 100 depicted in FIG. 1. One of ordinary skill in the art will also recognize that features depicted in the block diagram of the auto-synchronous isolated inlet power converter 300 and 400 may also be included in the auto-synchronous isolated inlet power converters 530a and 530b but have been omitted for clarity.

The power converter configuration 500 may be implemented using the master power converter 530a and the slave power converter 530b. The master power converter 530a includes a master AC inlet receptacle 330a, a master AC outlet receptacle 390a, a master controller 360a, and a master DC to AC converter 370a. The slave power converter 530b includes a slave AC inlet receptacle 330b, a slave AC outlet receptacle 390b, a slave controller 360b, and a slave DC to AC converter 370b. The master power converter 530a and the slave power converter 530b are coupled together by the AC bus 550. The master power converter 530a and the slave power converter 530b share many similar features with the power converter 100, the plurality of power converters 100(a-n), the power converter 300, and the power converter 400; therefore, only the differences between the power converter configuration 500 and the power converter 100, the plurality of power converters 100(a-n), the power converter 300, and the power converter 400 are to be discussed in further detail.

For discussion purposes, the power converter 530a operates as the master and the power converter 530b operates as the slave. However, as discussed in detail above, the power converters 530a and 530b may operate as either the master or slave depending on whether input AC power is applied to the respective AC inlet receptacle of each. The master power converter 530a may apply a constant voltage to an AC bus 550 that is coupling the AC inlet receptacle 330a and the AC outlet receptacle 390a of the master power converter 530a to the AC inlet receptacle 330b and the AC outlet receptacle 390b of the slave power converter 530b to maintain the paralleled output AC power generated by the power converter configuration 500. The slave power converter 530b may increase the current applied to the AC bus 550 when the voltage of the AC bus 550 decreases below the reference voltage due to an external electronic device being coupled to the power converter configuration 500. The slave power converter 530b may increase the current applied to the AC bus 550 so that the voltage of the AC bus 550 is increased back to the reference voltage so that the paralleled output AC power is maintained to adequately power the external electronic device.

After the master power converter 530a has synchronized with the slave power converter 530b, the external input AC power 112a is in parallel with the output AC power 195a and the output AC power 195b generating the paralleled output AC power. The paralleled output AC power may be accessed by coupling the external electronic device to the master AC outlet receptacle 390a and/or the slave AC outlet receptacle 390b. The AC bus 550 may provide an access point to the paralleled output AC power for the master controller 360a and the slave controller 360b to monitor.

The master controller 360a may initially instruct the master DC to AC converter 370a with a master power conversion signal 365a to provide a constant master voltage 560a to the AC bus 550 to maintain the paralleled output AC power at a specified level. The specified level may be the maximum output AC power that may be generated by the power converter configuration 500 with the external input AC power 112a in parallel with the output AC power 195a and the output AC power 195b. However, the specified level may be lowered based on the constant master voltage 560a supplied by the master DC to AC converter 370a to the AC bus 550. The specified level may be associated with the reference voltage of the paralleled output AC power. As noted above, the reference voltage of the paralleled output AC power is the voltage level that is to be maintained to generate the paralleled output AC power that is sufficient to power the external electronic device.

After an external electronic device is coupled to the master AC outlet receptacle 390a and/or the slave AC outlet receptacle 390b, the paralleled output AC power may temporarily decrease due to the load applied to the AC bus 550 by the external electronic device. The slave controller 360b may monitor the AC bus 550 with a slave AC bus monitoring signal 570b to monitor the voltage of the AC bus 550 to determine whether the voltage has decreased below the reference voltage of the AC bus 550 which in turn indicates that the paralleled output AC power has decreased below the specified level. The slave controller 360b may then instruct the slave DC to AC converter 370b with a slave power conversion signal 365b to increase the slave current 580b that is provided to the AC bus 550 when the slave controller 360b determines that the voltage of the AC bus 550 decreases after the external electronic device is coupled to the master AC outlet receptacle 390a and/or the slave AC outlet receptacle 390b. The slave current 580b may be increased to a level sufficient to increase the voltage of the AC bus 550 back to the reference voltage. Increasing the voltage of the AC bus 550 back to the reference voltage also increases the paralleled output AC power so that the paralleled output AC power is reinstated to the specified level with a minimal lapse in time. The maintaining of the paralleled output AC power at the specified level prevents a delay in the powering of the external electronic device.

The slave controller 360b may continue to monitor voltage of the AC bus 550 with the slave AC bus monitoring signal 570b to ensure that the voltage of the AC bus 550 does not decrease below the reference voltage. The slave controller 360b may continue to instruct the slave DC to AC converter 370b with the slave power conversion signal 365b to increase or decrease the slave current 580b accordingly based on the voltage of the AC bus 550 to maintain the paralleled output AC power at the specified level.

The slave DC to AC converter 370b may continue to provide the slave current 580b to the AC bus 550 until the slave DC to AC converter 370b no longer has the capability to provide the slave current 580b at the level necessary to maintain the voltage of the AC bus 550 at the reference voltage. For example, the slave DC to AC converter 370b may continue to provide the slave current 580b to the AC bus 550 until the DC source of the slave power converter 530b is drained to the point where the slave DC to AC converter 370b can no longer provide the slave current 580b at the level sufficient to maintain the voltage of the AC buss 550 at the reference voltage.

The master controller 360a also monitors the AC bus 550 with a master AC bus monitoring signal 570a. The master controller 360b monitors the AC bus 550 to determine when the voltage of the AC bus 550 decreases below the reference voltage for a period of time and is not increased back to the reference voltage. At that point, the master controller 360a may recognize that the slave DC to AC converter 370b is no longer generating slave current 580b at the level sufficient to maintain the voltage of the AC bus 550 at the reference voltage. The master controller 360a may then instruct the master DC to AC converter 370a with the master power conversion signal 365a to increase the master current 580a to a level sufficient to increase the voltage of the AC bus 550 back to the reference voltage so that the paralleled output AC power may be maintained at the specified level. As a result, a delay in the powering of the external electronic device may be minimized despite the draining of the DC source of the slave power converter 530b.

An Exemplary Auto-Synchronous Isolated Inlet Power Converter

Figure 6:
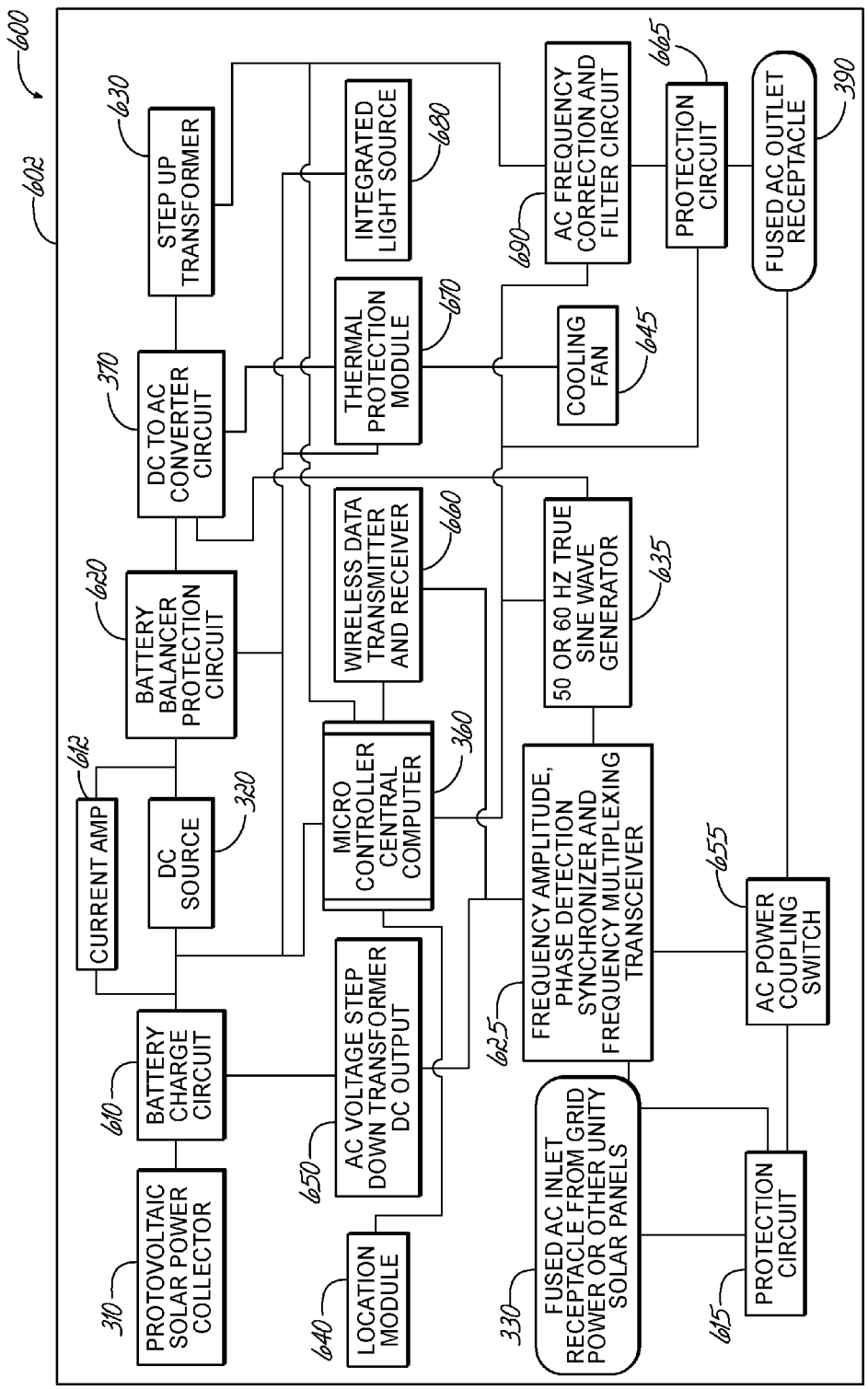
FIG. 6 is a block diagram of the exemplary auto-synchronous isolated inlet power converter that may be used in the auto-synchronous isolated inlet power converter configuration according to one exemplary embodiment of the present disclosure.

FIG. 6 is a block diagram of an exemplary auto-synchronous isolated inlet power converter 600 that may be used in the auto-synchronous isolated inlet power converter configuration 200 according to an exemplary embodiment of the present disclosure. Although, FIG. 6 depicts a block diagram of the auto-synchronous isolated inlet power converter 600, one of ordinary skill in the art will recognize that FIG. 6 may also depict a block diagram of the plurality of auto-synchronous isolated inlet power converters 100(a-n) used in the auto-synchronous isolated inlet power converter configuration 200 depicted in FIG. 2, and the auto-synchronous isolated inlet power converter 100 depicted in FIG. 1. One of ordinary skill in the art will also recognize that features depicted in the block diagram of the auto-synchronous isolated inlet power converter 300, 400, 530a, and 530b may also be included in the auto-synchronous isolated inlet power converter 600 but have been omitted for clarity.

The power converter 600 may be implemented using a battery charge circuit 610, a current amplifier 612, the DC source 320, a battery balancer protection circuit 620, a step transformer 630, a location module 640, an AC voltage step down transformer DC output 650, a wireless data transmitter and receiver 660, a thermal protection module 670, an integrated light source module 680, an AC frequency correction and filter circuit 690, a protection circuit 615, the AC inlet receptacle 330, the controller 360, the DC to AC converter 370, a frequency, amplitude, phase detection synchronizer and frequency multiplexing transceiver 625, a 50 or 60 Hertz (Hz) true sine wave generator 635, a cooling fan 645, a protection circuit 665, an AC power coupling switch 655 and the AC outlet receptacle 390. The power converter 600 shares many similar features with the power converter 100, the plurality of power converters 100(a-n), the power converter 300, the power converter 400, and the power converters 530a and 530b; therefore, only the differences between the power converter 600 and the power converter 100, the plurality of power converters 100(a-n), the power converter 300, the power converter 400, and the power converters 530a and 530b are to be discussed in further detail.

The battery charge circuit 610 may include passive and/or active circuitry as well as integrated circuits to control and/or regulate the charging of the DC source 320 included within the power converter 600. The battery charge circuit 610 may have bidirectional communication with a computing device, such as controller 360. The controller 360 may also control the battery charge circuit 610. The current amplifier 612 may increase the output current of the power converter and assist in charging the DC source 320.

The battery balancer protection circuit 620 is disposed within the housing 602 of the power converter 600. The battery balancer protection circuit 620 may include passive and/or active circuitry as well as integrated circuits that may be controlled by the controller 360. The battery balancer protection circuit 620 may be used to ensure safe discharge and recharge of the individual cells within the DC source 320.

The power converter 600 may further include a location module 640. The location module 640 may include one or several location sensors such as, but not limited to, a global positioning system (GPS), a compass, a gyroscope, an altimeter, and/or any other location sensor digital media file that will be apparent to those skilled in the relevant art(s) without departing from the spirit and scope of the disclosure. The location module 640 may be used to send data to the controller 360 through the wireless data transmitter and receiver 660 to an external personal computing device.

The AC voltage step down transformer 650 is included in the power converter 600. The step down transformer 650 may be used to charge the DC source 320 from the AC inlet receptacle 330 through the battery charge circuit 610. The step down transformer 650 may include iron, steel, ferrite or any other materials and fashioned specifically to satisfy power requirements for charging the DC source 320. The step down transformer 650 may also have a filtered DC output.

As discussed above, the power converter 600 includes a computing device such as the controller 360. The controller 360 may be used to control and/or monitor the power converter 600. The controller 360 may be a single or multiple processor based and may be able to receive software and/or firmware updates wirelessly through the associated wireless data transmitter and receiver 660 or through a hardware connection such as the frequency multiplexing transceiver 625. The controller 360 may be connected to any part of the power converter 600 for central control, remote control, general monitoring, and/or data collection purposes. The wireless data transmitter and receiver 660 may use Bluetooth, Wi-Fi, cellular, and/or any other acceptable radio frequency data transmissions and reception techniques that will be apparent to those skilled in the relevant art(s) without departing from the spirit and scope of the disclosure. The transmitter and receiver 660 may be used to transmit data from the power converter 600 to one or more external personal computing devices.

The power converter 600 includes a thermal protection module 670. The thermal protection module 670 includes one or more sensors positioned in one or more locations throughout any part of the power converter 600 for the purpose of temperature monitoring. The thermal protection module 670 is connected to the controller 360 and may be used to transmit data from the power converter 600 to external personal computing devices.

As shown, the power converter 600 may include the integrated light source 680. The integrated light source 680 may include one or more integrated lights inside or disposed on an exterior surface of the housing 602 of the power converter 600 and may be used as a light source. The integrated lights may vary in color, intensity, temperature, size, frequency, and/or brightness. The integrated light source 680 may be coupled to the controller 660. The integrated light source 680 may be used to transmit data from the power converter 600 to external personal computing devices.

The power converter 600 further includes a grid frequency, amplitude, power phase detection synchronizer and frequency multiplexing transceiver 625, which may synchronize multiple AC power sources and transmit data between one or more power converters 600 via a standard AC power line.

The power converter 600 further includes a frequency generator, such as a true sine wave generator 635, such as a 50 Hz or 60 Hz true sine wave generator 635. The frequency generator may be other types of generators configured to output a signal at a particular reference frequency. The sine wave generator 635 may provide a sine wave reference to the DC to AC converter 370. The sine wave generator 635 may be coupled to the controller 360 as well as the grid frequency, amplitude, power phase detection synchronizer and frequency multiplexing transceiver 625. Moreover, the sine wave generator 635 may include analog and/or digital circuitry.

The power converter 600 may further include a cooling fan 645 disposed within the housing 602 of the power converter 600. The cooling fan 645 may include one or more cooling fans arranged in a way that best ventilates an interior at least partially formed by the housing 602 of the power converter 600 in which one or more components are disposed. The cooling fan 645 may be coupled to the thermal protection module 670 and/or the controller 360.

Furthermore, the power converter 600 includes an AC frequency correction and filter circuit 690. The frequency correction and filter circuit 690 may be controlled by the controller 360 through the 50 Hz or 60 Hz true sine wave generator 635. In addition, the frequency correction and filter circuit 590 may receive AC power from the step up transformer 630 and may output corrected and filtered AC power to a protection circuit 615 of the power converter 600. The protection circuit 615 provides surge and fuse protection and may be controlled and monitored by the controller 360.

Moreover, the power converter 600 an AC coupling switch 655 that is configured to couple the AC power from the AC inlet receptacle 330 with AC grid equivalent power generated by the power converter 600 such that synchronized AC power from the AC inlet receptacle 330 and the power converter 600 are coupled together for output from the AC outlet receptacle 390. The AC coupling switch 655 may be controlled by the controller 360 in conjunction with the grid frequency, amplitude, power phase detection synchronizer and frequency multiplexing transceiver 625.

CONCLUSION

It is to be appreciated that the Detailed Description section, and not the Abstract section, is intended to be used to interpret the claims. The Abstract section may set forth one or more, but not all exemplary embodiments, of the present disclosure, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made without departing from the spirit and scope of the present disclosure. Thus the present disclosure should not be limited by any of the above-described exemplary embodiments, but should be defined only in accordance with the following claims and their equivalents.

What is claimed is:

1. An auto-synchronous isolated inlet power converter, comprising:
    a direct current (DC) source configured to supply DC power;
    an alternating current (AC) inlet receptacle configured to receive external input AC power generated from an AC power source external to the auto-synchronous isolated inlet power converter;
    an AC outlet receptacle configured to provide output AC power to systems external to the auto-synchronous isolated inlet power converter;
    a DC to AC converter configuration configured to:
        generate paralleled output AC power to the AC outlet receptacle when the auto-synchronous isolated inlet power converter is operating in a slave mode, wherein the paralleled output AC power is the output AC power generated from the external input AC power and the DC power supplied by the DC source that is converted to additional AC power that is synchronized and in parallel with the external input AC power, and generate the output AC power to the AC outlet receptacle when the auto-synchronous isolated inlet power converter is operating in a master mode, wherein the output AC power is generated from the additional AC power converted from the DC power supplied by the DC source and is not in parallel with the external input AC power.

2. The auto-synchronous isolated inlet power converter of claim 1, wherein the DC to AC converter configuration comprises:

a DC to AC converter configured to convert the DC power generated by the DC source to the additional AC power when the DC source provides the DC power to the DC to AC converter;

a first relay coupled to the AC inlet receptacle and the AC outlet receptacle and configured to transition into an open state when the auto-synchronous isolated inlet power converter is operating in the master mode to prevent the external input AC power from passing through to the AC output receptacle so that the AC inlet receptacle is isolated from the AC outlet receptacle; and a second relay coupled to the DC to AC converter and the AC outlet receptacle and configured to transition to a closed state when the auto-synchronous isolated inlet power converter is operating in the master mode so that the additional AC power provided by the DC to AC converter passes through the second relay to the AC output receptacle.

3. The auto-synchronous isolated inlet power converter of claim 2, wherein:

the second relay is configured to transition to the open state when the auto-synchronous isolated inlet power converter is transitioning from the master mode to the slave mode so that the additional AC power provided by the DC to AC converter is prevented from passing through to the AC output receptacle during the transition from the master mode to the slave mode; and the first relay is configured to transition to the closed state when the auto-synchronous isolated inlet power converter is transitioning from the master mode to the slave mode so that the external input AC power passes through the first relay to the AC output receptacle.

4. The auto-synchronous isolated inlet power converter of claim 3, further comprising:

a controller configured to synchronize the additional AC power generated by the DC to AC converter with the external input AC power coupled to the AC inlet receptacle before the additional AC power generated by the DC to AC converter passes through to the AC outlet receptacle during the transition from the master mode to the slave mode.

5. The auto-synchronous isolated inlet power converter of claim 4, wherein the second relay is further configured to transition to the closed state after the controller has synchronized the additional AC power to the external input AC power to allow AC power generated by the DC to AC converter to pass through to the AC outlet receptacle and generate the paralleled output AC power to the AC outlet receptacle so that the auto-synchronous isolated inlet power converter is operating in the slave mode.

6. The auto-synchronous isolated inlet power converter of claim 5, wherein the second relay is further configured to remain in the open state when the controller fails to synchronize the external input AC power to the additional AC power preventing the additional AC power from passing through to the AC outlet receptacle to combine with the external input AC power.

7. The auto-synchronous isolated inlet power converter of claim 6, wherein:

the first relay is configured to transition into the closed state when the auto-synchronous isolated inlet power converter is operating in a bypass mode so that the external input AC power passes through the first relay to the AC outlet receptacle; and the second relay is configured to transition into the open state when the auto-synchronous isolated inlet power converter is in the bypass mode to prevent any remaining converted additional AC power from passing through to the AC outlet receptacle.

8. A auto-synchronous isolated inlet power converter configuration, comprising:

a first auto-synchronous isolated inlet power converter included in a plurality of auto-synchronous isolated inlet power converters configured to:

automatically generate first output alternating current (AC) power for the first auto-synchronous isolated inlet power converter when the first auto-synchronous isolated inlet power converter fails to detect first external input AC power coupled to the first auto-synchronous isolated inlet power converter, wherein the first output AC power is output AC power generated from DC power of the first auto-synchronous isolated inlet power converter and is not in parallel with the first external input AC power, and act as a master auto-synchronous isolated inlet power converter when the first auto-synchronous isolated inlet power converter fails to detect the first external input AC power coupled to the first auto-synchronous isolated inlet power converter, wherein the master auto-synchronous isolated inlet power converter automatically provides the first output AC power to a slave auto-synchronous isolated inlet power converter included in the plurality of auto-synchronous isolated inlet power converters; and a second auto-synchronous isolated inlet power converter included in the plurality of auto-synchronous isolated inlet power converters configured to:

automatically transition into generating second paralleled output AC power, wherein the second paralleled output AC power is second output AC power generated by the second auto-synchronous isolated inlet power converter that is in parallel with the first output AC power generated by the first auto-synchronous isolated inlet power converter, and act as the slave auto-synchronous isolated inlet power converter when the second auto-synchronous isolated inlet power converter detects the first output AC power provided by the first auto-synchronous isolated inlet power converter.

9. The auto-synchronous isolated inlet power converter configuration of claim 8, wherein the first output AC power is synchronized with the second output AC power.

10. The auto-synchronous isolated inlet power converter configuration of claim 9, wherein a plurality of power characteristics associated with the first output AC power is substantially equivalent to a plurality of power characteristics associated with the second output AC power.

11. The auto-synchronous isolated inlet power converter configuration of claim 10, wherein the first output AC power includes a sinusoidal wave that is within a threshold of the sinusoidal wave included in the second output AC power.

12. The auto-synchronous isolated inlet power converter configuration of claim 11, wherein the first auto-synchronous isolated inlet power converter is further configured to:
  automatically transition to generating first paralleled output AC power, when the first auto-synchronous isolated inlet power converter detects the first external input AC power coupled to the first auto-synchronous isolated inlet power converter and the first output AC power is synchronized with the first external input AC power, wherein the first auto-synchronous isolated inlet power converter is acting as the slave auto-synchronous isolated inlet power converter.

13. The auto-synchronous isolated inlet power converter configuration of claim 12, wherein the second auto-synchronous isolated inlet power converter is further configured to:
  automatically generate the second output AC power for the second auto-synchronous isolated inlet power converter when the second auto-synchronous isolated inlet power converter fails to detect the first output AC power coupled to the second auto-synchronous isolated inlet power converter, wherein the second auto-synchronous isolated inlet power converter is acting as the master auto-synchronous isolated inlet power converter.

14. The auto-synchronous isolated inlet power converter configuration of claim 8, wherein the master auto-synchronous isolated inlet power converter is further configured to provide a constant voltage to an AC bus to maintain the second paralleled output AC power at a power level, wherein the AC bus couples the master auto-synchronous isolated inlet power converter to the slave auto-synchronous isolated inlet power converter.

15. The auto-synchronous isolated inlet power converter configuration of claim 14, wherein the slave auto-synchronous isolated inlet power converter is further configured to provide an increase in slave current to the AC bus when a voltage associated with the AC bus decreases below a reference voltage to increase the voltage to be substantially equivalent with the reference voltage, wherein the reference voltage is a voltage level associated with the second paralleled output AC power to maintain the second paralleled output AC power at the power level.

16. The auto-synchronous isolated inlet power converter configuration of claim 15, wherein the slave auto-synchronous isolated inlet power converter is further configured to provide the increase in the slave current to the AC bus until the slave auto-synchronous isolated inlet power converter is not capable of generating the slave current at a current level sufficient to maintain the voltage of the AC bus to be substantially equivalent to the reference voltage.

17. The auto-synchronous isolated inlet power converter configuration of claim 16, wherein the master auto-synchronous isolated inlet power converter is further configured to provide an increase in master current to the AC bus when the slave auto-synchronous isolated inlet power converter is not capable of generating the slave current at the current level sufficient to maintain the voltage of the AC bus to be substantially equivalent to the reference voltage.

* * * * *